Oct. 16, 1945.  S. V. DILLON  2,387,126
REMOTE CONTROL LOCKING MEANS
Filed June 5, 1941   2 Sheets-Sheet 2

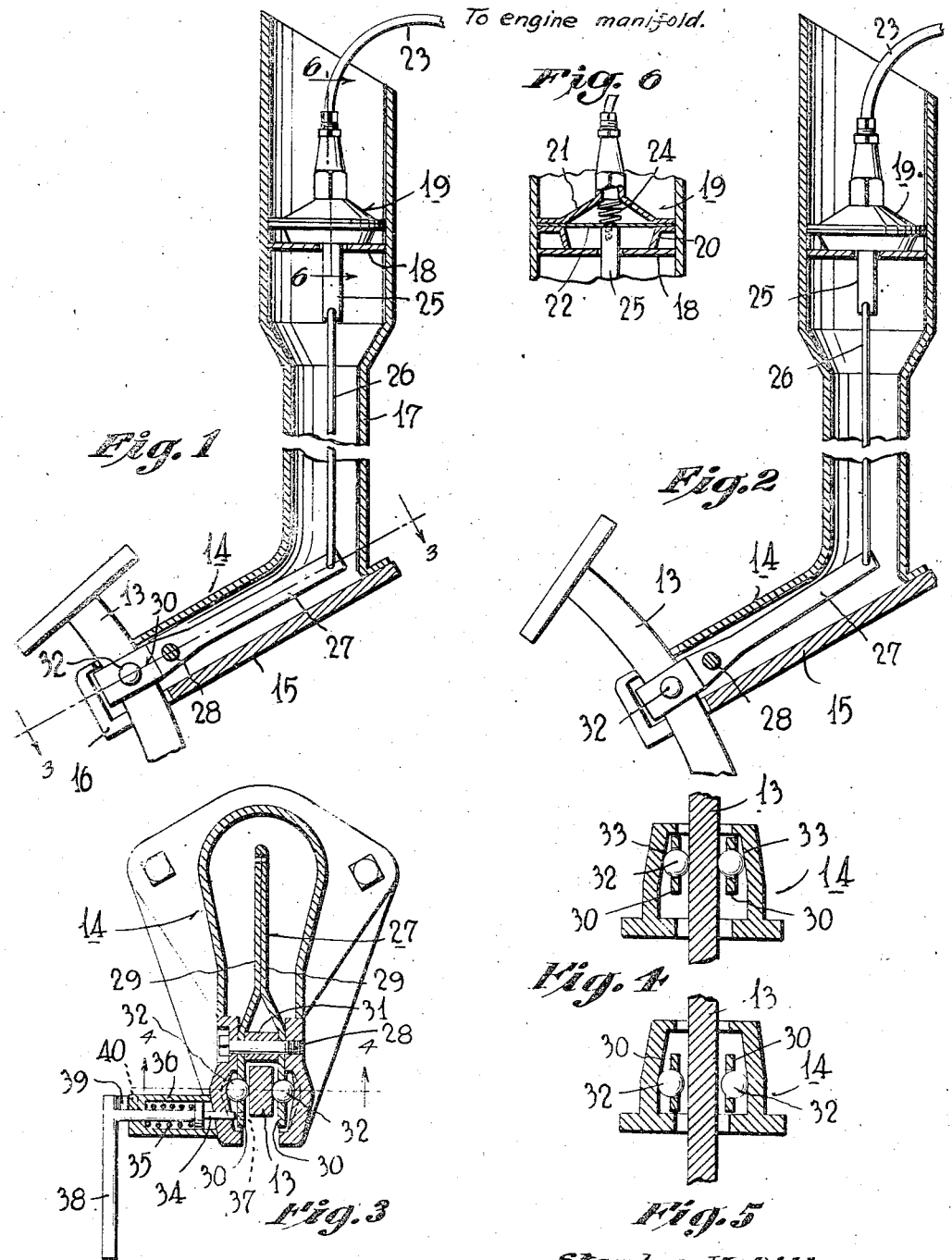

Stephen V. Dillon
INVENTOR

BY Barry & Cyr
ATTORNEYS

Patented Oct. 16, 1945

2,387,126

UNITED STATES PATENT OFFICE 2,387,126

REMOTE CONTROL LOCKING MEANS

Stephen V. Dillon, Tulsa, Okla.

Application June 5, 1941, Serial No. 396,774

6 Claims. (Cl. 74—531)

This invention relates to improvements in remotely controlled locking mechanism, and more particularly to such mechanism for use in automatically locking various elements of motor vehicles.

One of the objects of the invention is to provide novel locking means for a part or parts of a motor vehicle which will respond to the starting and stopping of the motor.

Another object is to supply mechanism of this character which is in the nature of an attachment so that it may be readily applied to an existing or previously built motor vehicle.

A still further object is to furnish remotely controlled locking mechanism for a control member of a motor vehicle, for instance, the brake pedal, so that the stopping of the motor may be employed in setting the locking mechanism in such a position as to hold the brake pedal in "on" position. Obviously, if the motor vehicle in this example happens to be an automobile, the locking of the brake in "on" position would prevent the vehicle from rolling down hill after the brake pedal had been locked.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a vertical sectional view of one embodiment of the invention shown applied to the brake pedal of a motor vehicle, and with the brake pedal depressed and locked in that position.

Fig. 2 is a similar view but showing the parts of my locking mechanism in unlocked position.

Fig. 3 is a horizontal sectional view taken on the line 3—3 of Fig. 1.

Fig. 4 is a substantially vertical sectional view of a detail taken on the line 4—4 of Fig. 3, and showing the balls of the locking mechanism in locking position.

Fig. 5 is a similar view with the balls in unlocked position.

Fig. 6 is a sectional view of a diaphragm motor which may be used in my mechanism; the section being taken on line 6—6 of Fig. 1.

Figure 7:
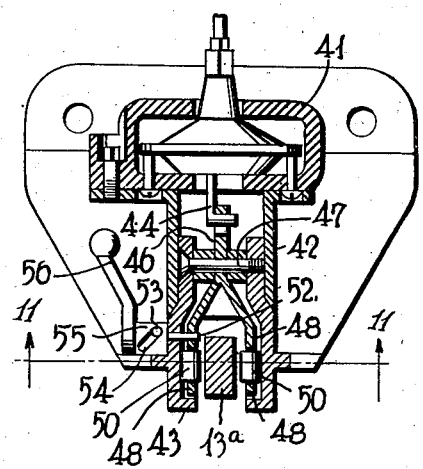
Fig. 7 is a sectional view of another modification of the invention.
Figure 9:
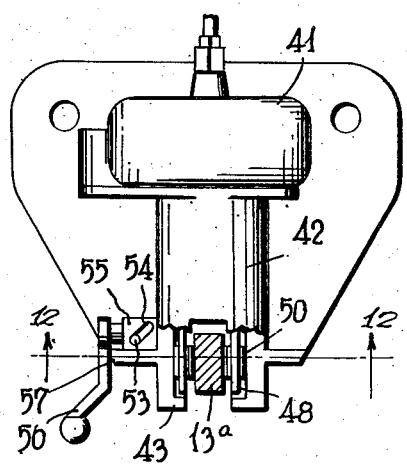
Fig. 9 is a top plan view of this modification with a portion of the same in substantially horizontal section.
Figure 8:
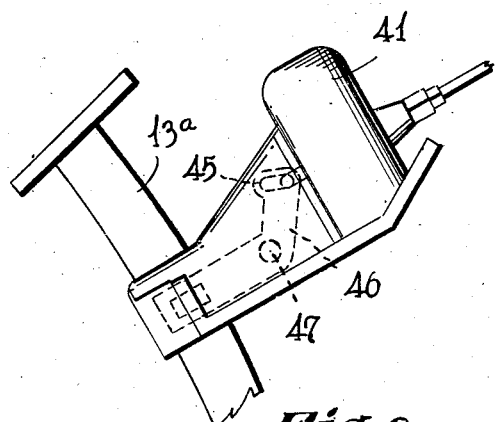
Fig. 8 is a side elevation of the structure shown in Fig. 7.
Figure 10:
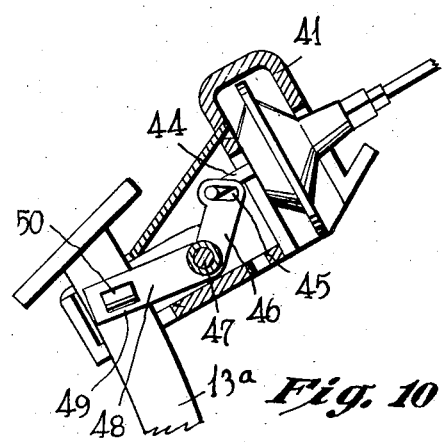
Fig. 10 is a vertical sectional view of this modification with the parts in pedal locking position.
Figure 11:
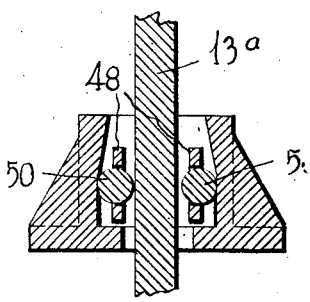
Fig. 11 is a vertical sectional view taken on the line 11—11 of Fig. 7, and with the locking device in unlocked position.

Referring first to the embodiment illustrated in Figs. 1 to 6 inclusive, it will be noted that 13 is a control member of a motor vehicle. Such member may be the clutch pedal or brake pedal of the vehicle, or might even be a member to control the transmission mechanism of the vehicle. Assuming that it is a brake pedal, I will combine the same with my improved attachment. This may consist of a housing 14 having a downwardly inclined foot 15 which may conform to the floor board (not shown) of the motor vehicle. The foot terminates in a bifurcated toe 16 adapted to receive the brake pedal.

The casing 14 also includes a vertical leg 17 which extends upwardly from the foot and houses a shelf 18 on which rests a diaphragm motor 19 of conventional construction. For instance, as illustrated in Fig. 6, the diaphragm motor may consist of a lower shell 20, and an upper shell 21 between which are clamped a diaphragm or movable partition 22. The upper shell may be connected by a tube 23 to the manifold of the engine (not shown) of the motor vehicle. Due to such construction, it will be understood that when suction is exerted in the manifold, the diaphragm 22 will be deformed upwardly, whereas when the motor stops and the suction is released, the diaphragm will assume normal position. This may be insured by any suitable means such as a spring 24, arranged in a shell 21 and exerting downward pressure on the diaphragm.

A stem 25 depends from and is secured to the central portion of the diaphragm and slidably engages the shelf 18 and a link 26 has its upper end secured to the stem. The link extends downwardly in the leg 17 and its lower end is connected to one end of a rocking lever 27 pivotally mounted on a horizontal shaft 28 extending across the foot 15. The lever, as best shown in Fig. 3, may be made of stamped metal and consist of opposite side members 29 which diverge from one another toward the pedal 13, so as to provide a pair of ball carriers 30 which extend at opposite sides of the pedal 13 and may be held in spaced relation by means of a sleeve 31 surrounding the shaft 28. Each ball carrier is provided with an aperture to accommodate a ball 32 which is designed, when the lever 27 is in a certain position, to clamp the brake pedal to the foot 15. In explanation, it will be noted (Fig. 4) that the toe portion of the foot is provided with oppositely disposed upwardly converging internal surfaces 33 which cause the balls to grip the pedal 13 when the motor is not running. On the other hand, when the motor is running, the ball carriers 30 will be lowered, and as this will cause the balls to move away from one another, they will no longer grip the pedal.

In operation, assuming that the motor is running, suction will be exerted in the tube 23, and this will cause upward movement of the central portion of the diaphragm 22, stem 25, and link 26. Hence, the lever 27 will be moved in a counterclockwise direction, and the ball carriers will be lowered to the positions shown in Figs. 2 and 5, where the balls will not interfere with the free up and down movement of the brake pedal. When, however, the engine stops, the parts of my mechanism will move into the positions shown in Figs. 1, 3 and 4, and, if at this time, the brake pedal is depressed to put the brakes "on," the pedal will be automatically locked in depressed position. Of course, as soon as the motor is started again, the parts will move to the positions shown in Figs. 2 and 5.

If for any reason it should be desirable to hold my mechanism in an inoperative position where it will not interfere with the movement of the pedal 13, regardless of whether the motor is running or not, this may be accomplished by an auxiliary latch which may be of the type illustrated in Fig. 3. Here, a latch pin 34 is normally forced toward one of the ball carriers by means of a spring 35 arranged in a cylinder 36. When the ball carriers are in lowered position, the pin will enter an aperture 37 in one of the ball carriers. The pin is connected at its outer end to a handle 38 employed in rocking the pin about its axis, and the handle has a detent 39 adapted to enter a notch or depression 40 in one end of the cylinder 35. When the detent occupies the notch, the spring 35 will force the end of the pin 34 into the hole 37 in order to hold the ball carriers in unlocked position. On the other hand, if the detent is withdrawn from the notch, and the handle 38 is turned so as to cause the detent to ride or slide over the outer end of the cylinder 35, the pin will be secured in unlatching position.

Figure 12:
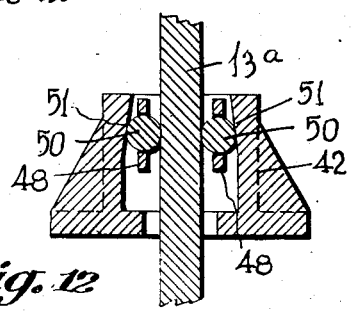
Fig. 12 is a view similar to Fig. 11, but taken on the line 12—12 of Fig. 9 and showing the mechanism in locking position.

In the embodiment of the invention illustrated in Figs. 7 to 12 inclusive, I have considerably shortened the length of my mechanism and have substituted rollers for the balls. In this form, the diaphragm motor casing 41 is secured directly to the end of the foot 42 opposite that of its bifurcated toe 43, and the stem 44 of the diaphragm is in the form of a hook which engages a slot 45 in one end of the lever 46 which is rockably mounted at 47 in the foot 42. The lever forms opposite ball carriers 48, each of which has an elongated slot 49 extending lengthwise thereof to accommodate a roller 50. These rollers, as shown in Fig. 12, are adapted to be moved toward one another by means of upwardly converging internal surfaces 51 of the foot 42 when the engine is not running, but when the engine is running, the roller carriers will be moved to the lowered position shown in Fig. 11, so as to release the brake pedal 13a.

Owing to the description of the structure illustrated in Figs. 1 to 6 inclusive, it is believed that the operation of the mechanism shown in Figs. 7 to 12 will be obvious without further description. However, it will be observed in connection with Figs. 7 and 9 that the auxiliary latch for the roller carriers may consist of a pin 52 designed to enter an aperture in one of the roller carriers (Fig. 7). The pin is associated with a radially extending finger 53 designed to travel in an inclined slot 54 in a cylinder 55. When the pin is turned about its axis, the finger 53 will travel along the inclined slot, and this results in withdrawing the pin from latching position. The turning of the pin may be accomplished by means of a handle 56 which can engage an abutment surface 57 projecting from the foot 42 and acting to hold the handle in the position where the pin is in unlatching position.

It has been proposed heretofore to remotely control the locking of various parts of a motor vehicle from the engine thereof, but so far as I am aware, all such structures have been built into the car, whereas with my arrangement, the locking arrangement can be applied to any car now built by merely connecting my attachment to the vehicle.

While I have disclosed what I now consider to be some preferred embodiments of the invention, I am aware that changes may be made in the details disclosed, without departing from the spirit thereof, as expressed in the claims.

What I claim and desire to secure by Letters Patent is:

1. The combination with a control member of a motor vehicle, of a casing having a bifurcated portion to receive said control member, carrying means arranged in the casing, rolling elements supported by the carrying means and adapted to engage opposite sides of the control member, means in the casing for wedging said rolling elements into locking engagement with said control member when the carrying means is moved to a predetermined position, and means associated with the casing and operatively connected with the carrying means for controlling the latter.

2. The combination with a control member of a motor vehicle, of a casing having a bifurcated portion to receive said control member, carrying means arranged in the casing, rolling elements supported by the carrying means and adapted to engage opposite sides of the control member, means in the casing for wedging said rolling elements into locking engagement with said control member when the carrying means is moved to a predetermined position, means associated with the casing and operatively connected with the carrying means for controlling the latter, and auxiliary latching means engageable with the carrying means for locking the carrying means in a position away from said predetermined position.

3. The combination with a conventional control pedal of a motor vehicle, of a casing having a bifurcated portion to receive a portion of said pedal, carrying means arranged in the casing, rolling elements supported by the carrying means and adapted to engage opposite sides of the pedal, means in the casing for wedging said rolling elements into locking engagement with said control member when the carrying means is moved to a predetermined position, and means including a portion arranged in the casing and operatively connected with the carrying means for controlling the latter.

4. In a motor vehicle having a depressible brake pedal extending through a floor board, locking means detachably mounted on said floorboard and comprising pivoted supporting means, rolling elements carried by said supporting means and engageable with opposite sides of said pedal, and stationary means for wedging said rolling elements into clamping engagement with said pedal when the supporting means is in a predetermined position.

5. The combination with a depressible brake pedal of a motor vehicle extending through a floor board, of a stationary casing detachably mounted on said floor board and having an opening through which the pedal extends, carrying means movably supported by the casing, rolling elements supported by the carrying means and adapted to engage opposite sides of the brake pedal, means in the casing for wedging said rolling elements into locking engagement with the brake pedal when the carrying means is moved to a predetermined position, and means in the casing and operatively connected with the carrying means for controlling the latter.

6. The combination with a control member of a motor vehicle extending through the floor board thereof, of a stationary casing detachably mounted on said floor board and having an opening to receive said control member, carrying means pivotally mounted in the casing, rolling elements supported by the carrying means and adapted to engage opposite sides of the control member, means in the casing for wedging said rolling elements into locking engagement with the control member when the carrying means is moved to a predetermined position, and means in the casing and operatively connected with the carrying means for controlling the latter.

STEPHEN V. DILLON.